(12) United States Patent
Bellamy et al.

(10) Patent No.: US 10,981,482 B2
(45) Date of Patent: Apr. 20, 2021

(54) PORTABLE TABLE ATTACHABLE AND DETACHABLE FROM THE INTERIOR TRIM OF A VEHICLE

(71) Applicant: JAGUAR LAND ROVER LIMITED, Warwickshire (GB)

(72) Inventors: Christopher Bellamy, Coventry (GB); Christopher Brown, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/333,000

(22) PCT Filed: Sep. 26, 2017

(86) PCT No.: PCT/EP2017/074394
§ 371 (c)(1),
(2) Date: Mar. 13, 2019

(87) PCT Pub. No.: WO2018/060203
PCT Pub. Date: Apr. 5, 2018

(65) Prior Publication Data
US 2019/0225131 A1    Jul. 25, 2019

(30) Foreign Application Priority Data

Sep. 28, 2016 (GB) ...................................... 1616423
Sep. 28, 2016 (GB) ...................................... 1616424

(51) Int. Cl.
| | |
|---|---|
| *B60N 3/00* | (2006.01) |
| *B60R 7/04* | (2006.01) |
| *B60R 11/02* | (2006.01) |
| B60R 11/00 | (2006.01) |
| A47C 7/68 | (2006.01) |

(Continued)

(52) U.S. Cl.
CPC .............. *B60N 3/004* (2013.01); *B60R 7/043* (2013.01); *B60R 11/02* (2013.01);
(Continued)

(58) Field of Classification Search
CPC ................ B60N 3/004; B64D 11/0638; B64D 11/00152; B60R 7/043; B60R 11/0252;
(Continued)

(56) References Cited

U.S. PATENT DOCUMENTS 1,809,866 A * 6/1931 Riesche ................... A47B 5/04
108/38
5,381,738 A * 1/1995 Meyer ...................... A47B 5/00
108/108

(Continued)

FOREIGN PATENT DOCUMENTS

| | | |
|---|---|---|
| DE | 102009032692 A1 | 1/2011 |
| DE | 202016101126 U1 | 6/2016 |

(Continued)

OTHER PUBLICATIONS

Combined Search and Examination Report under Sections 17 and 18(3) for Application No. GB1616423.8 dated Feb. 28, 2017.
(Continued)

*Primary Examiner* — Syed A Islam
(74) *Attorney, Agent, or Firm* — Carlson, Gaskey & Olds

(57) ABSTRACT

The present disclosure relates to a portable table (1) and to an interior trim assembly for a vehicle, the interior trim assembly comprising an interior trim section (60) and a portable table releasably attachable to the interior trim section, wherein in a stowage state the portable table is integrated with the interior trim section, and in a detached state the portable table is detached from the interior trim section for use as a table.

20 Claims, 10 Drawing Sheets

(51) Int. Cl.
*B60R 7/00* (2006.01)
*B64D 11/00* (2006.01)
*A47B 31/06* (2006.01)

(52) U.S. Cl.
CPC ........... *B60R 11/0252* (2013.01); *A47B 31/06* (2013.01); *A47C 7/68* (2013.01); *B60R 7/005* (2013.01); *B60R 2011/0015* (2013.01); *B60R 2011/0071* (2013.01); *B60R 2011/0075* (2013.01); *B64D 11/00152* (2014.12)

(58) Field of Classification Search
CPC ... B60R 7/005; B60R 2011/0015; A47C 7/68; A47B 31/06
USPC ......................................................... 297/163
See application file for complete search history.

(56) References Cited

U.S. PATENT DOCUMENTS

| | | | |
|---|---|---|---|
| 5,931,527 A * | 8/1999 | D'Onofrio | B60R 5/045 297/146 |
| 6,199,948 B1 | 3/2001 | Bush et al. | |
| 6,702,375 B1 | 3/2004 | Laskowski et al. | |
| 8,322,290 B1 * | 12/2012 | Mignano | A47B 23/043 108/157.1 |
| 8,434,415 B1 * | 5/2013 | Federici | A47C 7/62 108/38 |
| 2014/0319885 A1 | 10/2014 | Rouxel et al. | |

FOREIGN PATENT DOCUMENTS

| | | |
|---|---|---|
| EP | 2602149 A2 | 6/2013 |
| GB | 191420153 A | 9/1915 |
| GB | 2135181 A | 8/1984 |
| GB | 2424575 A | 10/2006 |
| JP | 2004113662 A | 4/2004 |

OTHER PUBLICATIONS

International Search Report and Written Opinion of the International Searching Authority for International application No. PCT/EP2017/074394 dated Jan. 19, 2018.

* cited by examiner

PORTABLE TABLE ATTACHABLE AND DETACHABLE FROM THE INTERIOR TRIM OF A VEHICLE

TECHNICAL FIELD

The present disclosure relates to a portable table and particularly, but not exclusively, to a portable table that is intended to be integrated with the interior trim of a vehicle. Aspects of the invention relate to a portable table, an interior trim assembly comprising a portable table, a vehicle seat comprising a portable table, and a vehicle comprising a portable table.

BACKGROUND

Passengers in a car may from time to time wish to perform an action that is most easily performed with the assistance of a table, for example reading, writing, eating, or operating a laptop computer or tablet device. For this reason some cars include one or more integrated tables that may be deployed from the interior trim for use by the passengers. For example, it is known to provide a table that is configured to be pivoted outwardly from the rear of a front row seat or from the side trim of the car, or a table that is configured to be raised upwardly from a centre console on an arm and then pivoted downwardly on the arm.

However, existing car tables are generally configured to be deployed into a single horizontal configuration for use as a table, which may not be the most convenient angle for all actions requiring a table.

It is also known to provide a general purpose portable table providing an angled table surface. However, known portable tables generally do not allow the angle of the table panel to be varied, and known portable tables with a movable table panel are generally significantly more delicate and less user-friendly than fixed portable tables.

It is an aim of the present invention to address disadvantages associated with the prior art.

SUMMARY OF THE INVENTION

An aspect of the present invention provides an interior trim assembly for a vehicle, the interior trim assembly comprising an interior trim section and a portable table releasably attachable to the interior trim section, wherein: in a stowage state the portable table is integrated with the interior trim section; and in a detached state the portable table is detached from the interior trim section for use as a table.

The detachable table is configured to remain integrated within the interior trim section and therefore conveniently stored in the vehicle when in the stowage state. The detachable table is further configured to be detached from the interior trim section such that it may be used as a table at any point within (or even outside) the vehicle when in the detached state, for example by being placed on a user's legs while the user is seated at any location within the vehicle.

It will be appreciated that the phrase "integrated with an interior trim section" means that the portable table is configured to be comprised in and form part of the interior trim section when not in use, and is not simply configured to be placed within a storage space such as a map pocket or externally attached to the interior trim section as an after-market device.

It will be appreciated that the term "table" refers to a device that is intended to provide a surface, optionally a substantially planar surface, on which a user may rest objects as desired. The term "table" in the context of this application does not require the presence of any legs (as found on common domestic tables). The portable table may, for example, take the form of a tray without any legs, such as a portable lap tray.

The interior trim assembly may be provided on a seat, for example on the back of the seat. The interior trim assembly may be for an automotive vehicle such as a car. Alternatively the interior trim assembly may be for another type of vehicle, for example a train or an aircraft.

The portable table may be configured to form part of an outer surface of the interior trim section when in the stowage state. For example, a main table surface of the portable table may be configured to form part of the outer surface of the interior trim section when the portable table is in the stowage state.

The portable table may at least substantially follow the contour of the outer surface of the interior trim section when the portable table is in the stowage state. For example, the portable table may at least substantially follow the contour of the outer surface of the interior trim section along at least one edge of the portable table, or along at least two edges of the portable table, or along at least three edges of the portable table, or along all four edges of the portable table.

At least a portion of the portable table may be at least substantially continuous with the outer surface of the interior trim section when the portable table is in the stowage state. For example, the portable table may be at least substantially flush with and extend at least substantially up to the surrounding outer surface of the interior trim section along at least one edge of the portable table, or along at least two edges of the portable table, or along at least three edges of the portable table, or along all four edges of the portable table. However, the interior trim assembly may include one for more gaps between the portable table and the surrounding interior trim section, for example to enable a user to grip the portable table and pull it away from the interior trim section.

The interior trim section may comprise a recess, and the portable table may be at least substantially located within the recess when in the stowage state. The recess in the interior trim section may have a shape that at least substantially matches the shape of the portable table.

The portable table may be substantially planar but comprise a pair of opposing edges that are curved or bent out from the plane of the portable table. For example, the portable table may comprise a main table surface that is substantially planar but comprises a pair of opposing edges that are curved or bent out from the plane of the main table surface, for example downwardly with respect to the main table surface. Such a shape may advantageously be arranged to follow the contour of the interior trim section. For example, where the interior trim section forms part of the back of a vehicle seat, the curved or bent edges may be configured to follow the contour of the back of the seat around the edges of the seat.

The portable table may comprise a table panel and a base. The portable table may be switchable between a closed configuration for stowage and an angled configuration, the angle between the table panel and the base being greater when the portable table is in the angled configuration than when the portable table is in the closed configuration. The closed configuration may be a more compact configuration for when the portable table is not in use (for example for stowage), although it will be appreciated that the portable table may also be used as a table when in the closed configuration. The angled configuration may allow the table panel to be angled either towards or away from a user (depending on the orientation of the portable table) when the portable table is in use, for example on a user's lap.

The table panel may be pivotally coupled to the base, for example by a hinge. The hinge may be located adjacent to an edge of the table panel. The base may be in the form of a panel. The base panel may be at least substantially planar and/or at least substantially rectangular. The base may be configured to lie at least substantially flat along a surface on which the portable table may be placed in use, for example a user's lap.

The portable table may further comprise a coupling mechanism for controlling relative movement of the table panel and the base, the coupling mechanism comprising a slider arranged to slide along a first one of the table panel and the base, and an intermediate element pivotally coupled to the slider and to the second one of the table panel and the base. The slider and intermediate element provide a strong, reliable, efficiently packaged and user-friendly coupling mechanism for controlling relative movement of the table panel and the base. The intermediate element may be in the form of a panel, and may be at least substantially planar. The intermediate element may be pivotally coupled to the slider at a first end thereof and pivotally coupled to the second one of the table panel and the base at a second end thereof.

The slider may be coupled to and configured to slide along one or more rails or tracks that are provided on the first one of the table panel and the base. The rails or tracks may be integrally formed with the first one of the table panel and the base, or alternatively may be formed as separate components that are fixed to the first one of the table panel and the base.

The portable table may further comprise a biasing system configured to impart a biasing force to the slider. Where the table panel is pivotally coupled to the base the biasing system may be configured to bias the slider in a direction away from the pivotal connection between the table panel and the base. The biasing system may comprise one or more springs, for example compression springs, acting between the slider and a fixed point on the first one of the table panel and the base. The biasing system may be configured to assist with opening of the portable table away from the closed configuration towards the angled configuration. Alternatively the portable table may comprise another type of biasing system configured to bias the table panel away from the base to assist with opening of the portable table, for example using a compression spring, leaf spring or rotary spring acting directly on the table panel and the base.

The portable table may further comprise a damping system configured to damp movement of the slider relative to the first one of the table panel and the base. The damping system may, for example, comprise a rotary damper with a pinion and a rack that engages the pinion. The damping system may act to damp movement of the table panel and the base relative to each other to thereby allow smoother and more controlled opening and closing of the portable table.

The table panel may be movable away from the base to a position of maximum opening that is beyond its position corresponding to the angled configuration of the portable table. In this case the portable table is openable beyond the angled configuration.

The coupling mechanism may be configured to limit the maximum angle to which the table panel is movable relative to the base. For example, the portable table may comprise a stopper arrangement and/or a biasing system configured to limit the extent of movement of the slider relative to the first one of the table panel and the base to thereby limit the maximum angle to which the table panel is movable relative to the base.

The table panel may be substantially parallel to the base when the portable table is in the closed configuration. For example, the table surface of the table panel may be substantially parallel to an outwardly facing surface of the base on which the base is configured to rest when the portable table is in the closed configuration.

The table panel may be at an angle of 10 to 30 degrees or an angle of approximately 15 degrees to the base when the portable table is in the angled configuration. For example, the table surface of the table panel may be at an angle of 10 to 30 to an outwardly facing surface of the base on which the base is configured to rest when the portable table is in the angled configuration. The table panel may be at an angle of 15 to 45 degrees or an angle of approximately 30 degrees to the base when the table panel is in the position of maximum opening.

The portable table may be substantially wedge shaped when in the angled configuration. The portable table may be substantially flat when in the closed configuration.

The table panel may comprise a recess in a face opposite to the table surface. The base may be at least substantially located within the recess when the portable table is in the closed configuration.

The portable table may comprise a retention system for releasably retaining the portable table in the closed configuration. The retention system may, for example, comprise one or more magnets comprised in the table panel and a corresponding set of one or more magnets comprised in the base which are configured to retain the portable table in the closed configuration until the table panel and the base are pulled apart with a force sufficient to overcome the magnetic attraction between the table panel and the base. It will be appreciated that other retention systems may also be used, for example systems comprising one or more latches or detents.

The portable table may comprise a locking arrangement configured to prevent the portable table from moving out of the angled configuration towards the closed configuration. The portable table may therefore be configured to be selectively locked in the angled configuration by the locking arrangement when the locking arrangement is engaged. The locking arrangement may optionally also be configured to prevent the portable table from moving out of the angled configuration away from the closed configuration when the locking arrangement is engaged where movement beyond the angled configuration is possible. It will be appreciated that the locking arrangement is not permanently engaged but rather is releasable to thereby allow the portable table to move out of the angled configuration and back towards the closed configuration. It will be appreciated that the portable table may be configured to adopt a plurality of different angled configurations, and that the locking arrangement may be configured to selectively lock the lock the portable table in a desired one of the angled configurations.

The locking arrangement may comprise a locking element, the locking element being reversibly movable into a locking position in which it acts to prevent the portable table from moving out of the angled configuration towards the closed configuration. The locking element may, for example, prevent the portable table from moving out of the angled configuration towards the closed configuration by bracing against the first one of the table panel and the base when the portable table is in the angled configuration and the locking element is in the locking position. The locking element may be pivotable into the locking position. The locking element may be configured to be locked in the locking position, for example by a tab extending from the locking element that is configured to be received within a detent provided on a sprung arm.

The locking element may be pivotally mounted to the intermediate element. The locking element may, for example, be pivotally mounted to the intermediate element at a location near to the pivotal connection between the intermediate element and the second one of the table panel and the base. The intermediate element may comprise a recess, and the locking element may be arranged to be located at least substantially within the recess when not in its locking position.

The locking element may be in the form of a panel flap.

The interior trim assembly may further comprise an attachment system for releasably retaining the portable table in the stowage state.

The attachment system may comprise at least one mounting element provided on the portable table that is configured to engage a corresponding at least one mounting feature provided on the interior trim section to thereby secure the portable table to the interior trim section in the stowage state. The mounting element of the portable table may comprise, for example, a hook or latch. Where the portable table comprises a table panel and a separate base as described above, the mounting element of the portable table may be provided on the base. The corresponding mounting feature of the interior trim section may comprise, for example, a hook or latch. The mounting element of the portable table may be movable with respect to the portable table to enable the portable table to be released from the stowage state, and the corresponding mounting feature of the interior trim section may be fixed with respect to the interior trim section. Alternatively the mounting element of the portable table may be fixed with respect to the portable table, and the corresponding mounting feature of the interior trim section may be movable with respect to the interior trim section to enable the portable table to be released from the stowage state.

Alternatively the attachment system may comprise a magnet system configured to attract the portable table towards the interior trim section to thereby secure the portable table to the interior trim section in the stowage state. Alternatively the attachment system may comprise an attachment element such as a sprung pocket, a sprung arm or an elastic strip that extends around the portable table when the portable table is in the stowage state to thereby secure the portable table to the interior trim section.

The interior trim assembly may further comprise at least one user-operable element configured to release the portable table from the stowage state. The user-operable element may comprise, for example, a button, a slider or a lever, and may be provided on the portable table or alternatively on the interior trim section. Where the portable table comprises a table panel and a separate base as described above, the user-operable element may be provided on the table panel. The user-operable element may be configured to move one of the mounting element of the portable table and the corresponding mounting feature of the interior trim section to thereby release the portable table from the stowage state. Alternatively the user-operable element may be configured to push the portable table away from the interior trim section.

The interior trim section may comprise a ledge configured to support a lower edge of the portable table when the portable table is in the stowage state. The ledge may be configured to bias the portable table upwardly when the portable table is in the stowage state.

The ledge may comprise a curved groove for receiving the lower edge of the portable table when the portable table is in the stowage state. The curved groove may be configured to facilitate pivotal movement of at least a portion of the portable table in a direction away from the interior trim section.

The ledge may comprise a lip portion configured to prevent movement of the lower edge of the portable table in a direction away from the interior trim section when the portable table is in the stowage state.

The portable table may be movable into a shelf configuration while attached to the interior trim section in which the portable table provides an upwardly facing surface for use as a shelf. The shelf surface may be at least substantially horizontal. Where the portable table comprises a slider and an intermediate element as described above, the shelf surface may be provided by the intermediate element. Where the portable table comprises a locking element as described above, the locking element may be movable into the locking position while the portable table is in the shelf configuration to provide a stand that is configured to support an article placed thereon. For example, the locking element may be configured to support a phone, tablet or other portable device, optionally in a generally upright orientation. Alternatively a separate flap may be provided specifically for the purpose of providing a stand, which may be pivotally mounted to the intermediate element.

A further aspect of the present invention provides a vehicle seat (for example an automotive vehicle seat such as a car seat) comprising an interior trim assembly as described above. The interior trim section may, for example, be on the back of the vehicle seat such that the portable table is attachable to and detachable from the back of the vehicle seat, in which case the portable table may form part of the outer surface of the seat back trim when in the stowage state. The vehicle seat may further comprise a map pocket located below the portable table. Alternatively the interior trim section may form part of a vehicle door or a vehicle centre console, or another portion of a vehicle interior.

A further aspect of the present invention provides a vehicle comprising an interior trim assembly as described above or a seat as described above. The vehicle may be an automotive vehicle such as a car, or alternatively another type of vehicle, for example a train or an aircraft.

A further aspect of the present invention provides a portable table comprising a table panel and a base; wherein the portable table is switchable between a closed configuration and an angled configuration, the angle between the table panel and the base being greater when the portable table is in the angled configuration than when the portable table is in the closed configuration, the portable table further comprising a coupling mechanism for controlling relative movement of the table panel and the base, the coupling mechanism comprising a slider arranged to slide along a first one of the table panel and the base, and an intermediate element pivotally coupled to the slider and to the second one of the table panel and the base.

The invention provides a strong, reliable, efficiently packaged and user-friendly portable table that can be used at any desired location. The angled configuration may allow the table panel to be angled either towards or away from a user (depending on the orientation of the portable table) when the portable table is in use, for example on a user's lap. The closed configuration may be a more compact configuration for when the portable table is not in use (for example for stowage), although it will be appreciated that the portable table may also be used as a table when in the closed configuration.

The table panel may be pivotally coupled to the base, for example by a hinge. The hinge may be located adjacent to an edge of the table panel.

The portable table may comprise a locking arrangement configured to prevent the portable table from moving out of the angled configuration towards the closed configuration. The portable table may therefore be configured to be selectively locked in the angled configuration by the locking arrangement when the locking arrangement is engaged. The locking arrangement may optionally also be configured to prevent the portable table from moving out of the angled configuration away from the closed configuration when the locking arrangement is engaged where movement beyond the angled configuration is possible. It will be appreciated that the locking arrangement is not permanently engaged but rather is releasable to thereby allow the portable table to move out of the angled configuration and back towards the closed configuration. It will be appreciated that the portable table may be configured to adopt a plurality of different angled configurations, and that the locking arrangement may be configured to selectively lock the lock the portable table in a desired one of the angled configurations.

The locking arrangement may comprise a locking element, the locking element being reversibly movable into a locking position in which it acts to prevent the portable table from moving out of the angled configuration towards the closed configuration. The locking element may, for example, prevent the portable table from moving out of the angled configuration towards the closed configuration by bracing against the first one of the table panel and the base when the portable table is in the angled configuration and the locking element is in the locking position. The locking element may be pivotable into the locking position. The locking element may be configured to be locked in the locking position, for example by a tab extending from the locking element that is configured to be received within a detent provided on a sprung arm.

The locking element may be pivotally mounted to the intermediate element. The locking element may, for example, be pivotally mounted to the intermediate element at a location near to the pivotal connection between the intermediate element and the second one of the table panel and the base. The intermediate element may comprise a recess, and the locking element may be arranged to be located at least substantially within the recess when not in its locking position.

The locking element may be in the form of a panel flap.

The slider may be coupled to and configured to slide along one or more rails or tracks that are provided on the first one of the table panel and the base. The rails or tracks may be integrally formed with the first one of the table panel and the base, or alternatively may be formed as separate components that are fixed to the first one of the table panel and the base.

The portable table may further comprise a biasing system configured to impart a biasing force to the slider. Where the table panel is pivotally coupled to the base the biasing system may be configured to bias the slider in a direction away from the pivotal connection between the table panel and the base. The biasing system may comprise one or more springs, for example compression springs, acting between the slider and a fixed point on the first one of the table panel and the base. The biasing system may be configured to assist with opening of the portable table away from the closed configuration towards the angled configuration. Alternatively the portable table may comprise another type of biasing system configured to bias the table panel away from the base to assist with opening of the portable table, for example using a compression spring, leaf spring or rotary spring acting directly on the table panel and the base.

The portable table may further comprise a damping system configured to damp movement of the slider relative to the first one of the table panel and the base. The damping system may, for example, comprise a rotary damper with a pinion and a rack that engages the pinion. The damping system may act to damp movement of the table panel and the base relative to each other to thereby allow smoother and more controlled opening and closing of the portable table.

The portable table may further comprise a retention system for releasably retaining the portable table in the closed configuration. The retention system may, for example, comprise one or more magnets comprised in the table panel and a corresponding set of one or more magnets comprised in the base which are configured to retain the portable table in the closed configuration until the table panel and the base are pulled apart with a force sufficient to overcome the magnetic attraction between the table panel and the base. It will be appreciated that other retention systems may also be used, for example systems comprising one or more latches or detents.

The table panel may be movable away from the base to a position of maximum opening that is beyond its position corresponding to the angled configuration of the portable table. In this case the portable table is openable beyond the angled configuration.

The coupling mechanism may be configured to limit the maximum angle to which the table panel is movable relative to the base. For example, the portable table may comprise a stopper arrangement and/or a biasing system configured to limit the extent of movement of the slider relative to the first one of the table panel and the base to thereby limit the maximum angle to which the table panel is movable relative to the base.

The table panel may be substantially parallel to the base when the portable table is in the closed configuration. For example, the table surface of the table panel may be substantially parallel to an outwardly facing surface of the base on which the base is configured to rest when the portable table is in the closed configuration.

The table panel may be at an angle of 10 to 30 degrees or an angle of approximately 15 degrees to the base when the portable table is in the angled configuration. For example, the table surface of the table panel may be at an angle of 10 to 30 to an outwardly facing surface of the base on which the base is configured to rest when the portable table is in the angled configuration. The table panel may be at an angle of 15 to 45 degrees or an angle of approximately 30 degrees to the base when the table panel is in the position of maximum opening.

The portable table may be substantially wedge shaped when in the angled configuration. The portable table may be substantially flat when in the closed configuration.

The base may be in the form of a panel. The base panel may be at least substantially planar, and may be at least substantially rectangular. The base may be configured to lie at least substantially flat along a surface on which the portable table may be placed in use, for example a user's lap.

The intermediate element may be in the form of a panel. The intermediate panel may be at least substantially planar. The intermediate element may be pivotally coupled to the slider at a first end thereof and pivotally coupled to the second one of the table panel and the base at a second end thereof.

The slider may be in the form of a panel. The slider panel may be at least substantially planar.

The table panel may comprise a recess in a face opposite to the table surface. The base may be at least substantially located within the recess when the portable table is in the closed configuration.

The portable table may be configured to be releasably attached to an interior trim section of or for a vehicle in a stowage state in which the portable table is integrated with the interior trim section, and to be detached from the interior trim section for use as a table. In this case the portable table may be supplied together with the interior trim section and/or the vehicle. Alternatively the portable table may be supplied separately, for example as a separate device to be integrated with the trim of a vehicle, or as a replacement part, or to an automotive manufacturer.

A further aspect of the present invention provides an interior trim assembly for a vehicle, the interior trim assembly comprising an interior trim section and a portable table as described above. The portable table may be releasably attachable to the interior trim section, wherein: in a stowage state the portable table is integrated with the interior trim section; and in a detached state the portable table is detached from the interior trim section for use as a table. It will be appreciated that the phrase "integrated with an interior trim section" means that the portable table is configured to be comprised in and form part of the interior trim section when not in use, and is not simply configured to be placed within a storage space such as a map pocket or externally attached to the interior trim section as an aftermarket device. The interior trim assembly may be for an automotive vehicle such as a car, or alternatively for another type of vehicle, for example a train or an aircraft.

The portable table may be movable into a shelf configuration while attached to the interior trim section in which the intermediate element provides an upwardly facing surface for use as a shelf. The shelf surface may be at least substantially horizontal.

The locking element may be movable into the locking position while the portable table is in the shelf configuration to provide a stand that is configured to support an article placed thereon. For example, the locking element may be configured to support a phone, tablet or other portable device, optionally in a generally upright orientation. Alternatively a separate flap may be provided specifically for the purpose of providing a stand, which may be pivotally mounted to the intermediate element.

The portable table may be configured to form part of an outer surface of the interior trim section when in the stowage state. For example, a main table surface of the portable table may be configured to form part of the outer surface of the interior trim section when the portable table is in the stowage state.

The portable table may at least substantially follow the contour of the outer surface of the interior trim section when the portable table is in the stowage state. For example, the portable table may at least substantially follow the contour of the outer surface of the interior trim section along at least one edge of the portable table, or along at least two edges of the portable table, or along at least three edges of the portable table, or along all four edges of the portable table.

At least a portion of the portable table may be at least substantially continuous with the outer surface of the interior trim section when the portable table is in the stowage state. For example, the portable table may be at least substantially flush with and extend at least substantially up to the surrounding outer surface of the interior trim section along at least one edge of the portable table, or along at least two edges of the portable table, or along at least three edges of the portable table, or along all four edges of the portable table. However, the interior trim assembly may include one for more gaps between the portable table and the surrounding interior trim section, for example to enable a user to grip the portable table and pull it away from the interior trim section.

The interior trim section may comprise a recess, and the portable table may be at least substantially located within the recess when in the stowage state. The recess in the interior trim section may have a shape that at least substantially matches the shape of the portable table.

The portable table may be substantially planar but comprise a pair of opposing edges that are curved or bent out from the plane of the portable table. For example, the portable table may comprise a main table surface that is substantially planar but comprises a pair of opposing edges that are curved or bent out from the plane of the main table surface, for example downwardly with respect to the main table surface. Such a shape may advantageously be arranged to follow the contour of the interior trim section. For example, where the interior trim section forms part of the back of a vehicle seat, the curved or bent edges may be configured to follow the contour of the back of the seat around the edges of the seat.

The interior trim assembly may further comprise an attachment system for releasably retaining the portable table in the stowage state.

The attachment system may comprise at least one mounting element provided on the portable table that is configured to engage a corresponding at least one mounting feature provided on the interior trim section to thereby secure the portable table to the interior trim section in the stowage state. The mounting element of the portable table may comprise, for example, a hook or latch. Where the portable table comprises a table panel and a separate base as described above, the mounting element of the portable table may be provided on the base. The corresponding mounting feature of the interior trim section may comprise, for example, a hook or latch. The mounting element of the portable table may be movable with respect to the portable table to enable the portable table to be released from the stowage state, and the corresponding mounting feature of the interior trim section may be fixed with respect to the interior trim section. Alternatively the mounting element of the portable table may be fixed with respect to the portable table, and the corresponding mounting feature of the interior trim section may be movable with respect to the interior trim section to enable the portable table to be released from the stowage state.

Alternatively the attachment system may comprise a magnet system configured to attract the portable table towards the interior trim section to thereby secure the portable table to the interior trim section in the stowage state. Alternatively the attachment system may comprise an attachment element such as a sprung pocket, a sprung arm or an elastic strip that extends around the portable table when the portable table is in the stowage state to thereby secure the portable table to the interior trim section.

The interior trim assembly may further comprise at least one user-operable element configured to release the portable table from the stowage state. The user-operable element may comprise, for example, a button, a slider or a lever, and may be provided on the portable table or alternatively on the interior trim section. Where the portable table comprises a table panel and a separate base as described above, the user-operable element may be provided on the table panel. The user-operable element may be configured to move one of the mounting element of the portable table and the corresponding mounting feature of the interior trim section to thereby release the portable table from the stowage state. Alternatively the user-operable element may be configured to push the portable table away from the interior trim section.

The interior trim section may comprise a ledge configured to support a lower edge of the portable table when the portable table is in the stowage state. The ledge may be configured to bias the portable table upwardly when the portable table is in the stowage state.

The ledge may comprise a curved groove for receiving the lower edge of the portable table when the portable table is in the stowage state. The curved groove may be configured to facilitate pivotal movement of at least a portion of the portable table in a direction away from the interior trim section.

The ledge may comprise a lip portion configured to prevent movement of the lower edge of the portable table in a direction away from the interior trim section when the portable table is in the stowage state.

A further aspect of the present invention provides a vehicle seat (for example an automotive vehicle seat such as a car seat) comprising an interior trim assembly as described above. The interior trim section may, for example, be on the back of the vehicle seat such that the portable table is attachable to and detachable from the back of the vehicle seat, in which case the portable table may form part of the outer surface of the seat back trim when in the stowage state. The vehicle seat may further comprise a map pocket located below the portable table.

Alternatively the interior trim section may form part of a vehicle door or a vehicle centre console, or another portion of a vehicle interior.

A further aspect of the present invention provides a vehicle comprising a portable table as described above, an interior trim assembly as described above, or a seat as described above. The vehicle may be an automotive vehicle such as a car, or alternatively another type of vehicle, for example a train or an aircraft.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
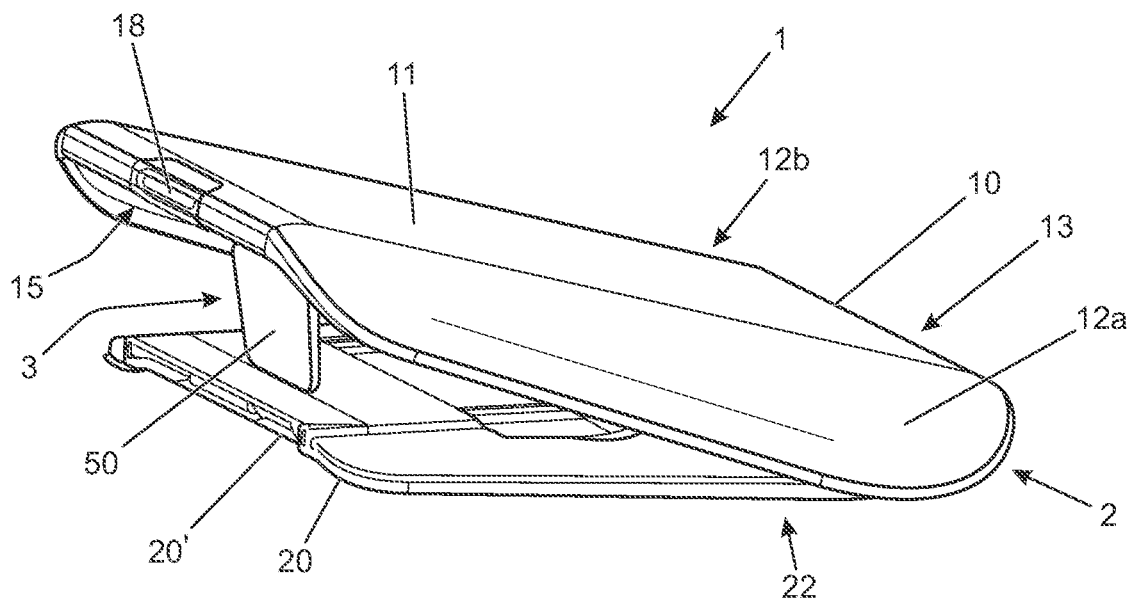
FIGS. 1 and 2 illustrate a portable table according to an embodiment of the present invention.
Figure 12:
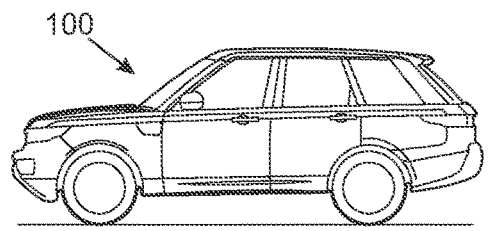
FIG. 12 illustrates a vehicle including the seat of FIGS. 9a to 11b.

FIG. 1 illustrates a portable table 1 according to an embodiment of the present invention. The portable table is provided as part of the interior trim of a vehicle (for example a car 100, as illustrated in FIG. 12) and is configured to be coupled to the back of a front seat of the vehicle (as described in detail below). However, the portable table 1 is detachable from the vehicle seat and may advantageously be used independently as a table at any point within or outside the vehicle 100.

The portable table 1 comprises a main table panel 10 that provides a main table surface 11 onto which a user may place various items when the portable table 1 is in use, for example a book, a tablet device, or a laptop computer. The main table panel 10 is rectangular and substantially planar, but comprises a pair of opposing side edges 12a, 12b that curve downwardly out of the plane of the main table panel 10.

Figure 3:
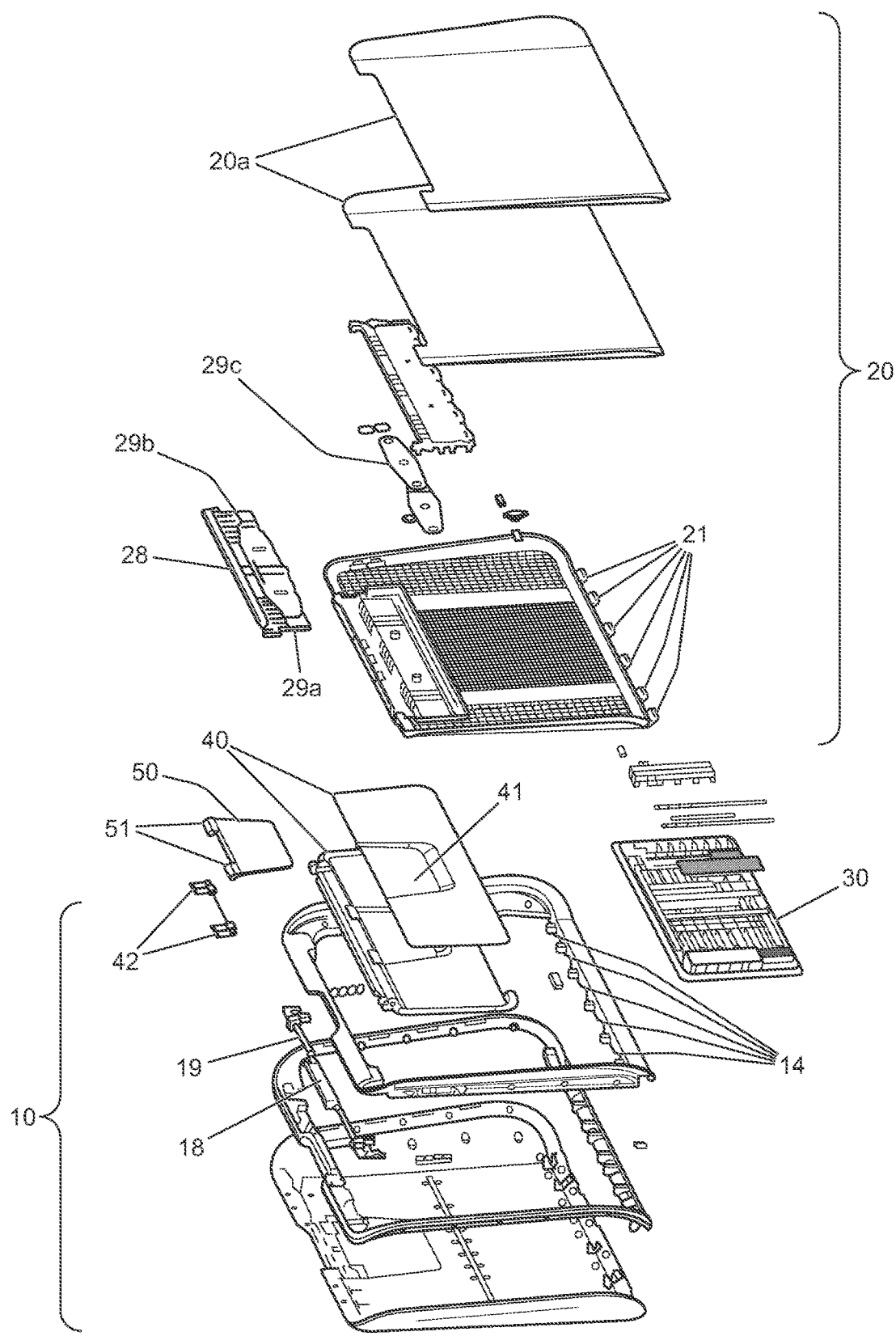
FIG. 3 provides an exploded view of the portable table of FIGS. 1 and 2.

The portable table 1 further comprises a rectangular and substantially planar base panel 20 that is located on the underside of the main table panel 10, respective to its orientation in use. The base panel 20 is pivotally coupled to the main table panel 10 at a main hinge 2 located adjacent to, and optionally slightly inset from, a front edge 13 of the main table panel 10 such that the main table panel 10 may be pivoted relative to the base panel 20 to vary the angle of the main table surface 11. The main hinge 2 is provided by a plurality of projections 21 that extend outwardly from an edge of the base panel and are rotatably received in corresponding recesses 14 provided in the main table panel 10, which are visible in the exploded view of FIG. 3. The base panel 20 is configured to be placed on a surface such as a user's lap and to support the portable table 1 when the portable table is in use. The outwardly facing surface 22 of the base panel 20 (on which the base panel rests in use) may be padded and/or formed to receive a typical user's leg shape.

Figure 2:
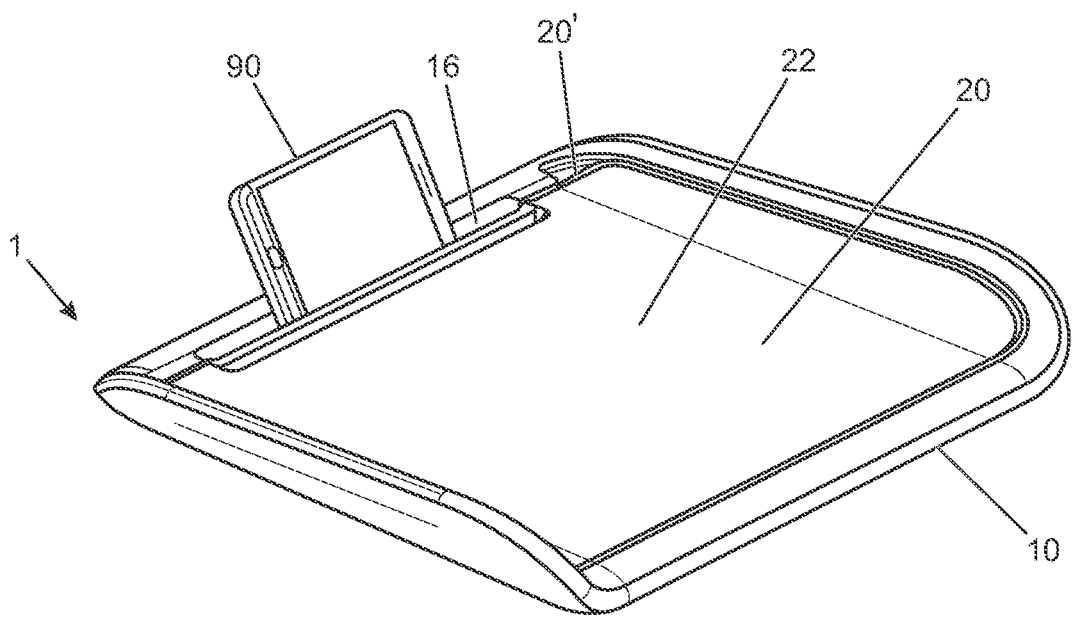

The portable table 1 is switchable between a closed configuration as illustrated in FIG. 2 (in which the portable table 1 is illustrated upside down and resting on its main table surface 11) and an angled configuration as illustrated in FIG. 1. When the portable table 1 is in the closed configuration the main table panel 10 is substantially parallel to the base panel 20, and when the portable table 1 is in the angled configuration the main table panel 10 is at an increased angle relative to the base panel 20.

In use, the portable table 1 may be placed on a substantially horizontal surface (for example a user's lap where the user's upper legs are substantially horizontal) in the angled configuration with the front edge 13 of the main table panel (that is the edge adjacent to the main hinge 2) facing towards the user to provide a table surface that is conveniently angled towards the user. Alternatively, the portable table 1 may be placed on an upwardly angled surface (for example a user's lap where the user's upper legs are angled upwardly) in the angled configuration with the front edge 13 of the main table panel facing away from the user to provide a table surface that is substantially horizontal. Alternatively, the portable table may be used as a table while in the closed configuration either on a substantially horizontal surface or on an angled surface.

The main table panel 10 comprises a recess 15 provided on its underside, and the base panel 20 is located within the recess 15 when the portable table 1 is in the closed configuration. The main table panel 10 is larger than the base panel 20, and overhangs the base panel 20 along all four edges of the portable table 1, as illustrated in FIG. 2. The outer surface 22 of the base panel 20 is generally flush and continuous with the surrounding portions of the underside of the main table panel 10, although a gap 16 is provided at the interface between the base panel 20 and the main table panel 10 along the edge of the base panel 20 that is furthest from the main hinge 2 in order to enable a user to grip the edge of the base panel 20 when opening the portable table 1. Although the portable table 1 is generally intended to be used with the outer surface 11 of the main tale panel 10 (that is the main table surface) facing upwardly, it is also possible to use the portable table 1 upside down such that the outer surface 22 of the base panel 20 faces upwardly. In this case the gap 16 formed between the base panel 20 and the main table panel 10 may be used to support a tablet device or phone 90, as illustrated in FIG. 2, or as a pen holder.

Figure 5A:
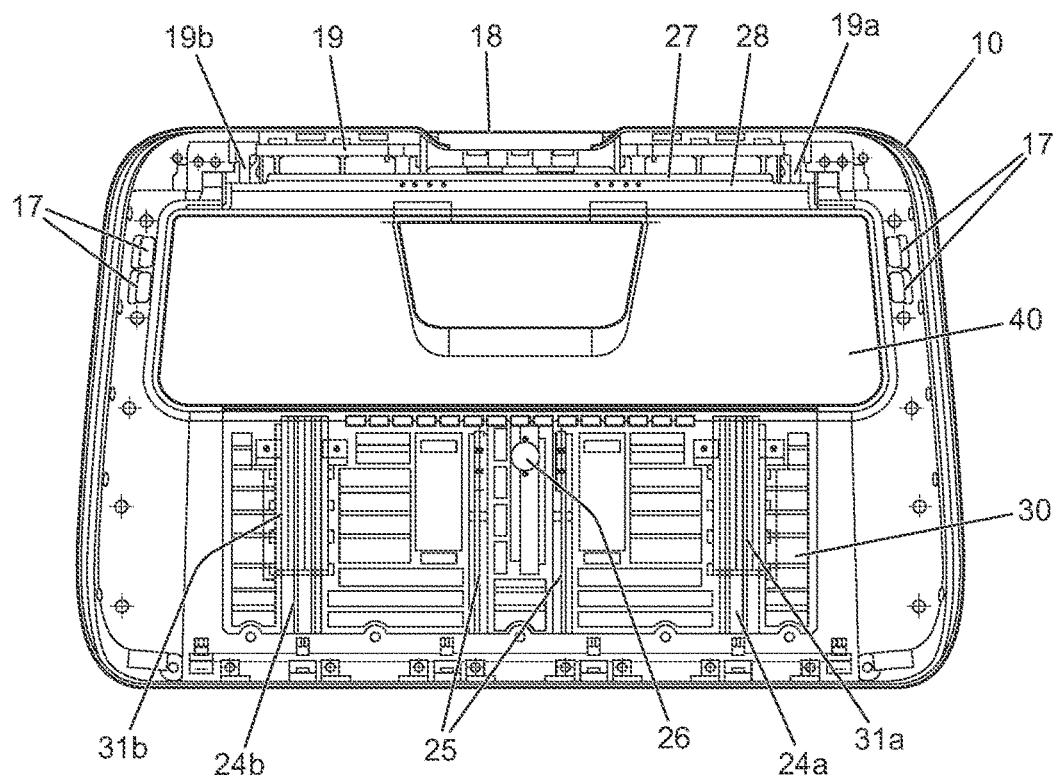
FIGS. 5a, 5b and 6 illustrate various parts of the portable table of FIGS. 1 and 2.
Figure 5B:
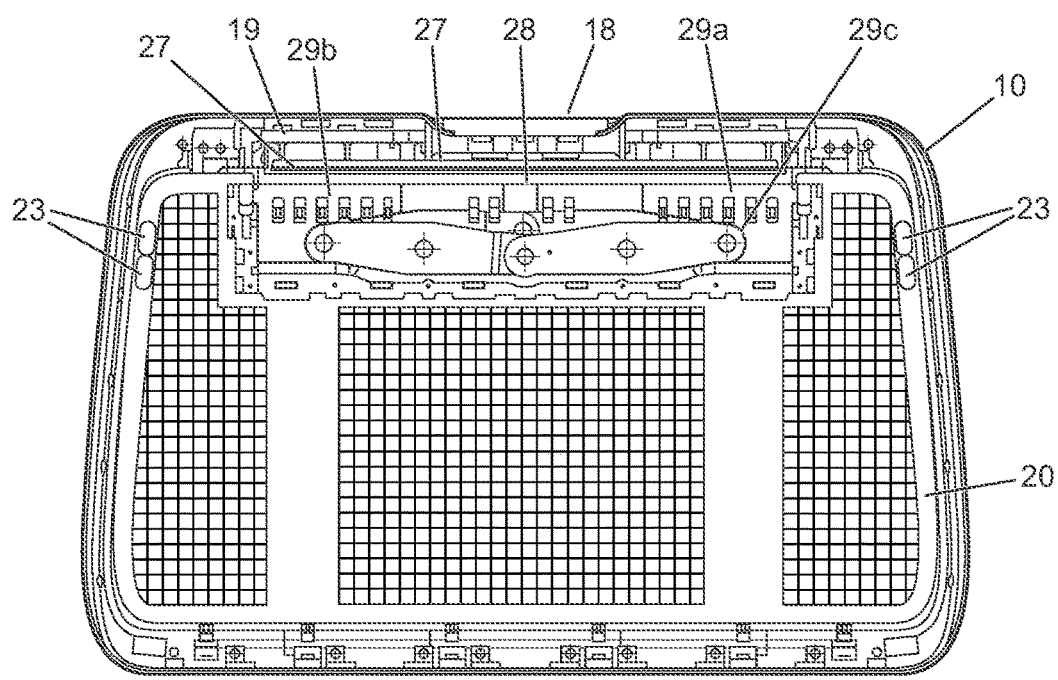

As illustrated in FIGS. 5a and 5b, the portable table 1 comprises a set of magnets 17 comprised in the main table panel 10 and a corresponding set of magnets 23 comprised in the base panel 20 that are arranged to retain the portable table 1 in the closed configuration until the main table panel 10 and the base panel 20 are pulled apart by a user with a force sufficient to overcome the magnetic attraction between the main table panel 10 and the base panel 20. The magnets 17, 23 are provided with keeper plates, which act to create a circular magnetic field.

Figure 4A:
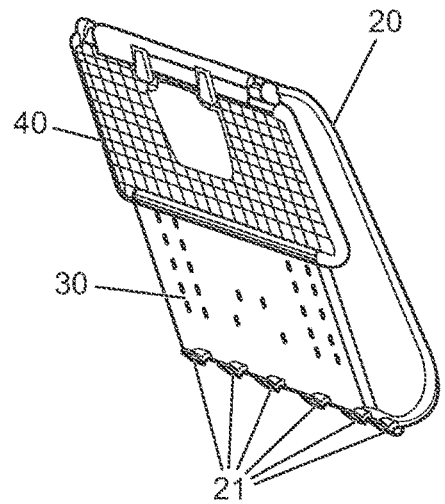
FIGS. 4a to 4d illustrate a coupling mechanism of the portable table of FIGS. 1 and 2.
Figure 4B:
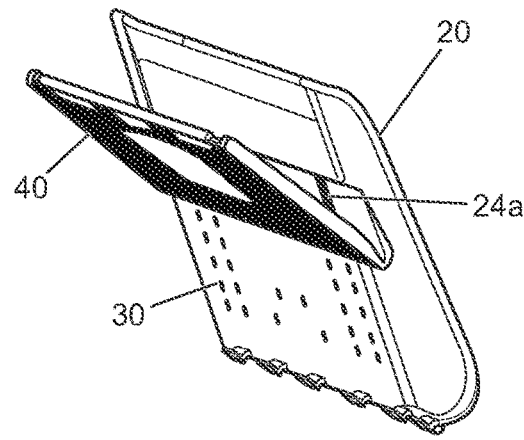
Figure 4C:
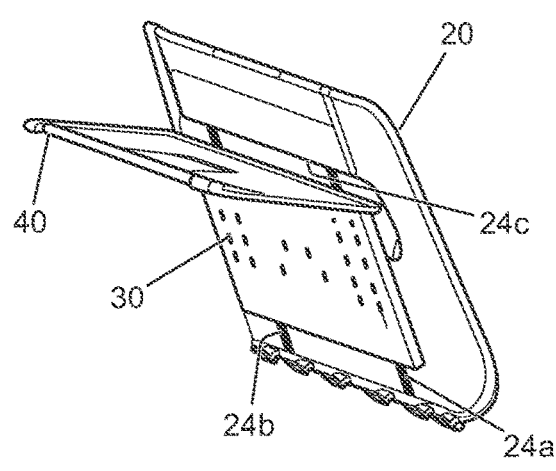
Figure 4D:
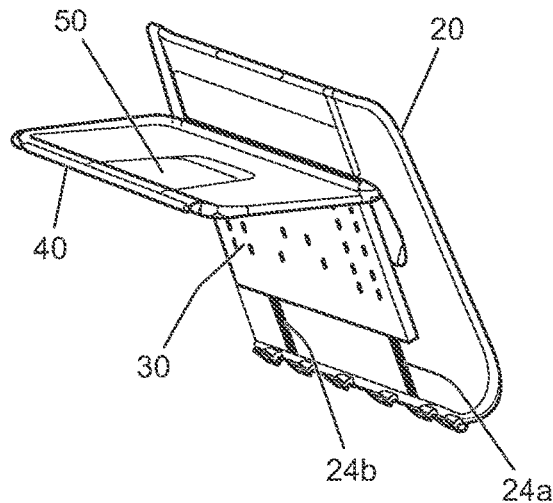

FIGS. 4a to 4d illustrate the portable table 1 in various possible configurations with the main table panel 10 removed to expose an upper surface of the base panel 20 (the upper surface being the surface facing towards the main table panel 10 and away from the surface 22 on which the base panel 20 rests in use). As shown in FIGS. 4b to 4d, the base panel 20 comprises two sets of rails 24a, 24b moulded into the upper surface thereof. As shown in FIG. 5a, each set of rails 24a, 24b comprises a plurality of closely spaced parallel rails that each extend in a direction away from the main hinge 2. A pair of slide blocks 31a, 31b, illustrated in the exploded view of FIG. 3 and in FIG. 5a in which the base panel 20 has been removed to expose the underside of the main table panel 10, are coupled respectively to the sets of rails 24a, 24b and configured to slide along the respective sets of rails 24a, 24b towards and away from the main hinge 2. Each of the slide blocks 31a, 31b is fixed to a slider panel 30 (illustrated in FIGS. 4a to 4d and FIG. 5a) that is located between the base panel 20 and the main table panel 10. The slider panel 30 is configured to slide towards and away from the main hinge 2 as the slide blocks 31a, 31b slide along the rails 24a, 24b, as illustrated in FIGS. 4a to 4d. The base panel 20 is provided with a stopper formation 24c (illustrated in FIG. 4c) that is configured to engage the slider panel 30 in order to limit the extent of movement of the slider panel 30 in the direction away from the main hinge 2.

In embodiments of the invention, the portable table 1 comprises a pair of compression springs 25 which are each coupled to the base panel 20 and to the slider panel 30 in order to bias the slider panel 30 away from the main hinge 2. Each spring 25 is provided with an internal guide rod to prevent buckling during compression. The portable table 1 further comprises a damping system 26 (illustrated in FIG. 5a) including a rotary damper fixed to the base panel 20 and a toothed rack provided on the underside of the slider panel 30 that engages a pinion of the rotary damper in order to damp movement of the slider panel 30 towards and away from the main hinge 2.

Figure 7:
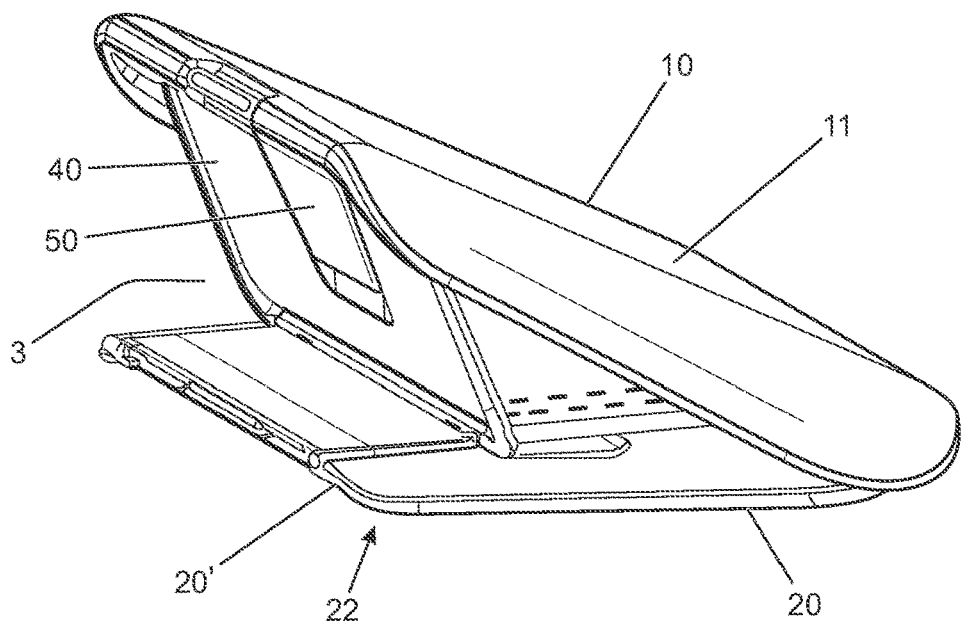
FIG. 7 illustrates the portable table of FIGS. 1 and 2 in a position of maximum opening.

The portable table 1 further comprises an intermediate panel 40 located between the base panel 20 and the main table panel 10, as illustrated in FIG. 7. The intermediate panel 40 is pivotally coupled to the slider panel 30 at the end of the slider panel furthest from the main hinge 2 and pivotally coupled to the main table panel 10 at a location slightly inboard of the edge of the main table panel furthest from the main hinge 2. The intermediate panel 40 is provided with a flap 50 that is pivotally mounted thereto on the side of the intermediate panel 40 facing towards the base panel 20 at a location adjacent to the pivotal connection between the intermediate panel 40 and the main table panel 10. The flap 50 is located within a recess 41 provided in the surface of the intermediate panel 40 facing towards the base panel 20, and is pivotable away from the intermediate panel 40 and towards the base panel 20 into a locking position. As illustrated in the exploded view of FIG. 3, the flap 50 comprises a pair of tabs 51 extending beyond the pivotal connection between the flap 50 and the intermediate panel 40, and the intermediate panel 40 is provided with a corresponding pair of sprung arms 42 including detents for receiving the tabs 51 to thereby lock the flap 50 in the locking position.

The slider panel 30 and the intermediate panel 40 together provide a coupling mechanism 3 for controlling relative movement of the main table panel 10 and the base panel 20, as described below. The flap 50 provides a locking arrangement for preventing the portable table 1 from moving out of the angled configuration towards the closed configuration, as also described below.

Figure 6:
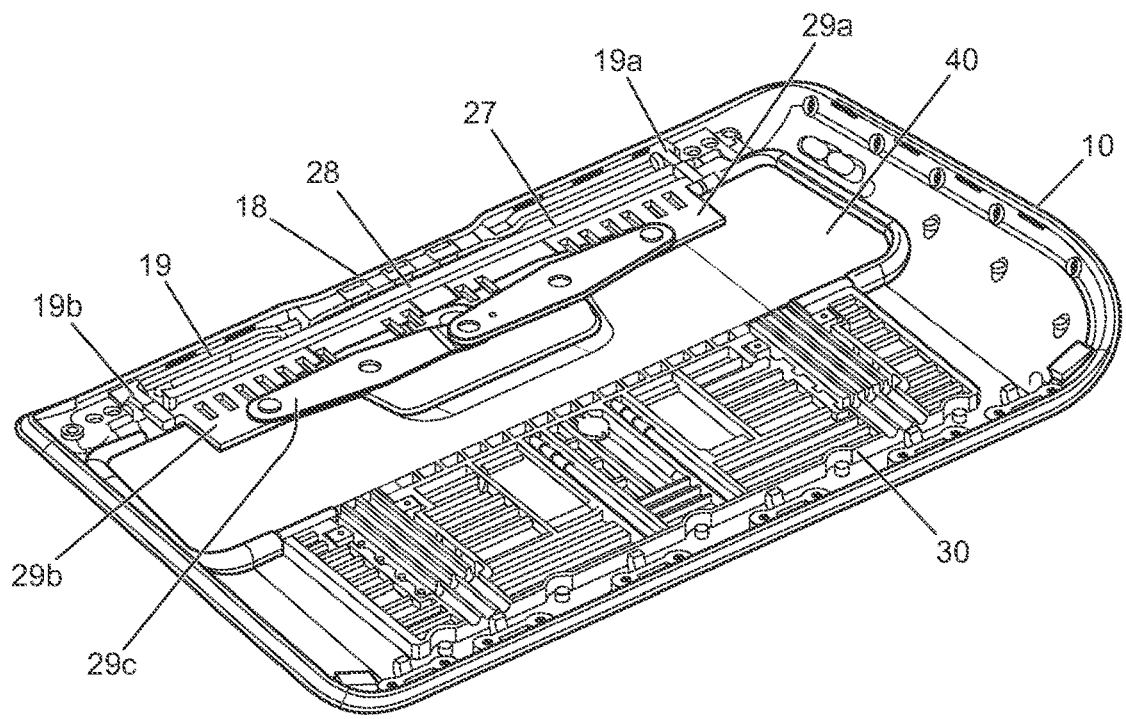

As shown in FIG. 5b and FIG. 6, the base panel 20 comprises an elongate aperture 27 formed along its edge furthest from the main hinge 2, and a movable mounting element in the form of an elongate latch 28 that projects outwardly from the aperture 27 into the gap 16 formed between the base panel 20 and the main table panel 10. (In FIG. 5b the outer skin 20a of the base panel 20 has been removed to expose the internal mechanism of the base panel, and in FIG. 6 the base panel 20 and the slider panel 30 have been removed but the latch 28 has been retained.) The latch 28 is mounted to a pair of sliding blocks 29a, 29b that are slidably located within the base panel 20. The latch 28 is arranged to be retracted into the base panel 20 in response to a user pressing a button 18 located at the edge of the main table panel 10 furthest from the main hinge 2. The button 18 is connected to a bar 19 that is located within the main table panel 10 in the portion of the main table panel 10 that overhangs the base panel 20. The bar 19 extends substantially across the width of the main table panel 10, and is provided with a pusher 19a, 19b at each end thereof, each pusher 19a, 19b extending in a direction towards the base panel 20. The pushers 19a, 19b are configured to be moved downwardly in a direction towards the base panel 20 in response to a user pushing on the button 18, and to pass through the aperture 27 formed in the edge of the base panel 20 furthest from the main hinge 2 to thereby enter the base panel 20 and push on the slider blocks 29a, 29b to thereby retract the latch 28 into the base panel 20. The latch 28 is biased into its extended position by a biasing system, and so remains in its extended position except while the button 18 is depressed. The slider blocks 29a, 29b are coupled to each other by a parallel link mechanism 29c (illustrated in FIG. 5b) that acts to ensure that the slider blocks 29a, 29b operate together and in sync with each other such that the latch 28 does not become skewed during retraction or subsequent redeployment. The latch 28 forms part of an attachment system 4 for securing the portable table to a vehicle seat, as described below.

Figure 8A:
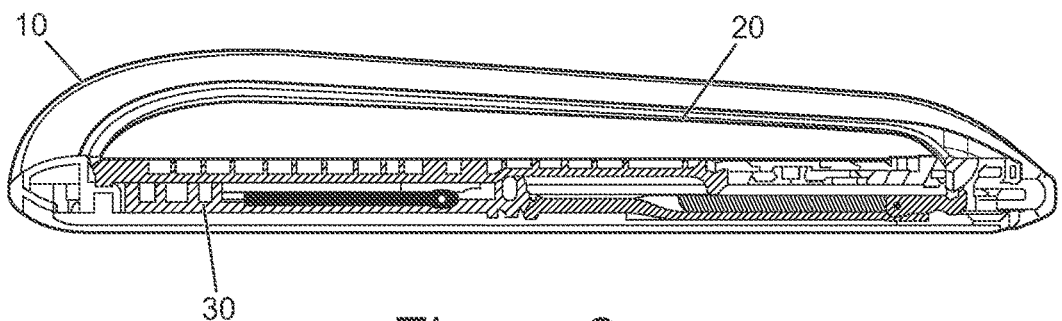
FIGS. 8a to 8c provide cross-section views through the portable table of FIGS. 1 and 2.
Figure 8B:
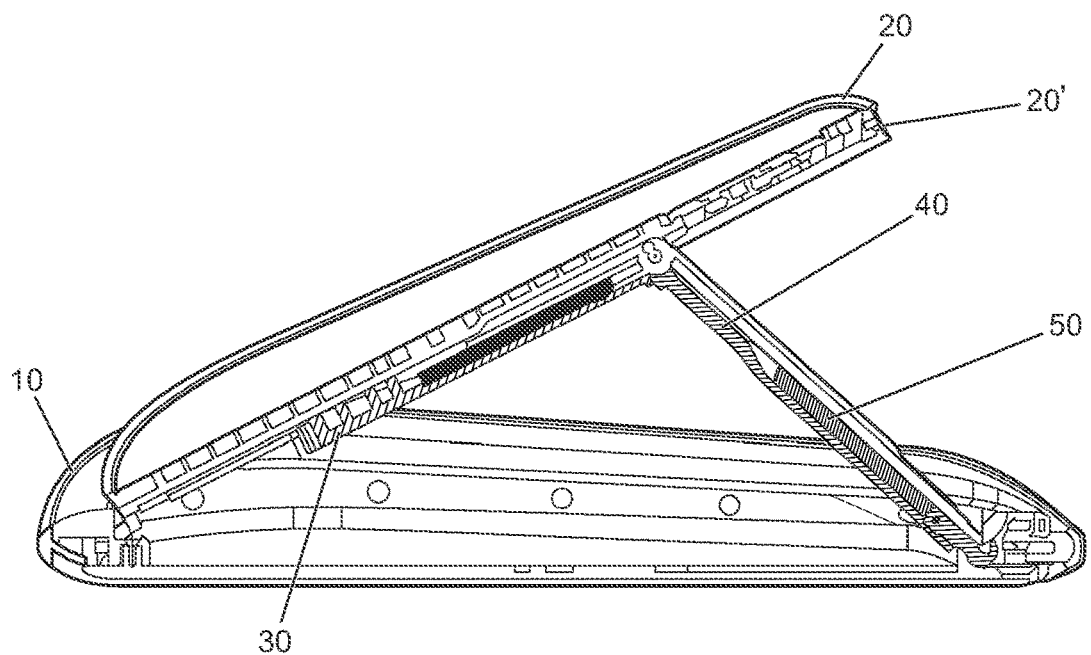
Figure 8C:
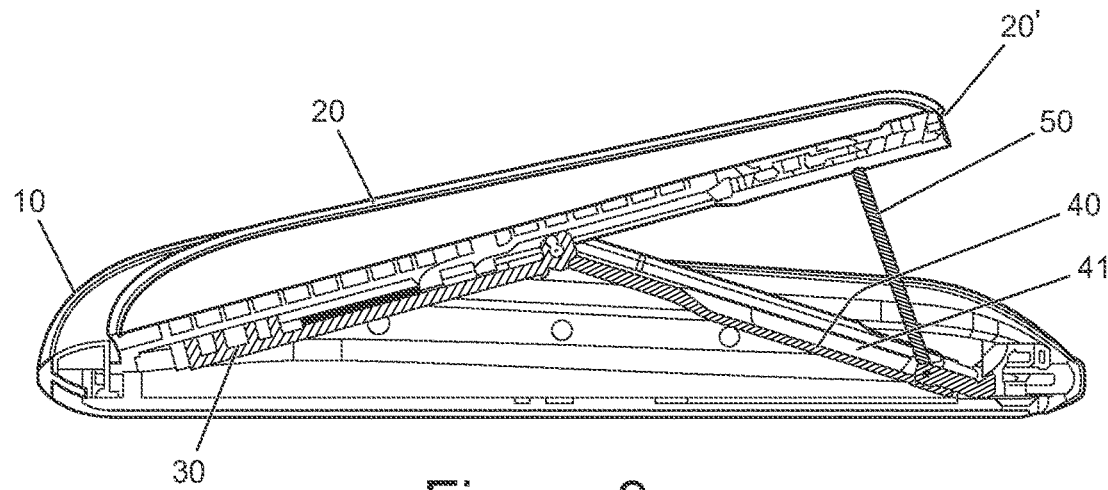
Figure 14A:
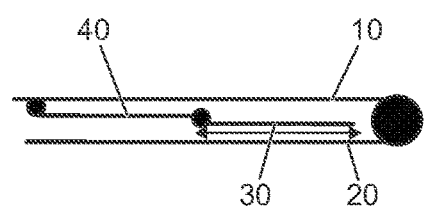
FIGS. 14a to 14c schematically illustrate the portable table of FIGS. 1 and 2 in various different configurations.
Figure 14B:
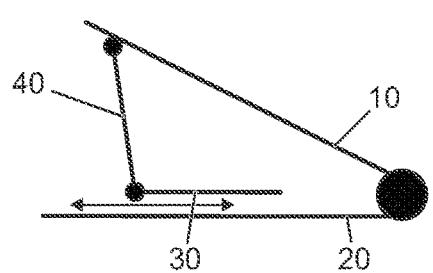
Figure 14C:
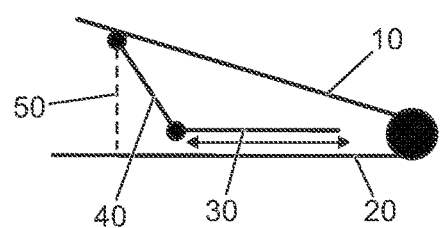

When it is desired to move the portable table 1 from the closed configuration, as illustrated in FIG. 2 and in cross-section in FIGS. 8a and 14a, into the angled configuration, as illustrated in FIG. 1 and in cross-section in FIGS. 8c and 14c, a user may grip the edge 20' of the base panel 20 furthest from the main hinge 2 and pull the base panel 20 away from the main table panel 10 about the main hinge 2 with a force large enough to overcome the magnetic attraction between the main table panel 10 and the base panel 20. As the portable table 1 begins to open, the main table panel 10 pulls the intermediate panel 40 out of its initial position in line with the slider panel 30, thereby allowing the compression springs 25 to push the slider panel 30 away from the main hinge 2 along the rails 24a, 24b. As the slider panel 30 is pushed away from the main hinge 2 (as illustrated in FIGS. 4a to 4d), it pushes the intermediate panel 40 away from the main hinge 2, thereby causing the intermediate panel 40 to push the main table panel 10 further away from the base panel 20 about the main hinge 2 to assist the opening motion of the portable table 1. The main table panel 10 and the base panel 20 may then be rotated away from each other about the main hinge 2 until the main table panel 10 reaches a position of maximum opening relative to the base panel 20, as illustrated in cross section in FIGS. 8b and 14b. At this point, the stopper formation 24c engages the slider panel 30 to thereby prevent further movement of the slider panel 30 away from the main hinge 2, thereby preventing further opening of the portable table 1.

When the main table panel 10 is in its position of maximum opening relative to the base panel 20, the user may pull the flap 50 outwardly from the intermediate panel 40 into the locking position. Once the flap 50 is in the locking position, the base panel 20 may then be rotated relative to the main table panel 10 about the main hinge 2 back towards the main table panel 10 until the distal end of the flap 50 comes into contact with the base panel 20, as illustrated in FIGS. 8c and 14c. At this point the portable table 1 becomes stable in the angled configuration, with the flap 50 acting as a locking element to prevent the portable table 1 from closing any further, and the portable table 1 can be used as an angled table with either the main table panel 10 or the base panel 20 facing upwardly.

When it is desired to move the portable 1 table back into the closed configuration, the user may simply pull the main table panel 10 and the base panel 20 slightly further apart from each other about the main hinge 2, fold the flap 50 back down into the intermediate panel 40, and then push the main table panel 10 and the base panel 20 together until the closed configuration is reached, at which point the magnets 17, 23 in the main table panel 10 and the base panel 20 attract each other to retain the portable table 1 in the closed configuration. As the portable table 1 is closed, the slider panel 30 is pushed back towards the main hinge 2 by the intermediate panel 40 against the action of the compression springs 25.

Figure 9A:
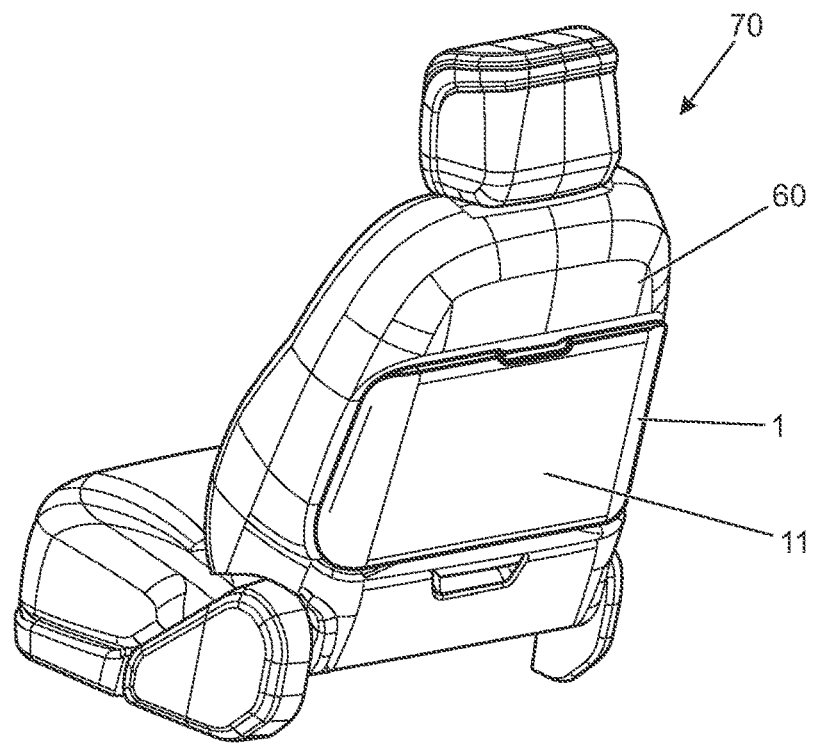
FIGS. 9a to 11b illustrate a vehicle seat comprising an interior trim assembly according to an embodiment of the present invention.

Although the portable table 1 is configured to be used independently as a table in the manner described above, the portable table is provided as an integral part of the interior trim of a vehicle 100, and is configured to be detachably coupled to an interior trim section 60 at the back of a front seat 70 of the vehicle 100 in a stowage state. In embodiments of the invention the portable table is also deployable into a shelf configuration while attached to the seat trim, as described below. The portable table 1 and the interior trim section 60 together form an interior trim assembly according to an embodiment of the present invention. FIG. 9a illustrates the vehicle seat 70 including the portable 1 table in its stowage state.

When the portable table 1 is in the stowage state, it sits within a recess 61 provided in the seat trim 60 and is integrated with the trim at the back of the seat 70. In this state, the main table surface 11 of the portable table 1 forms part of the outer surface of the seat trim 60 and substantially follows the contour of the back of the seat 70 (including wrapping around the edges of the seat). The edges of the portable table 1 are substantially flush and continuous with the portions of the seat trim 60 surrounding the portable table 1.

Figure 10A:
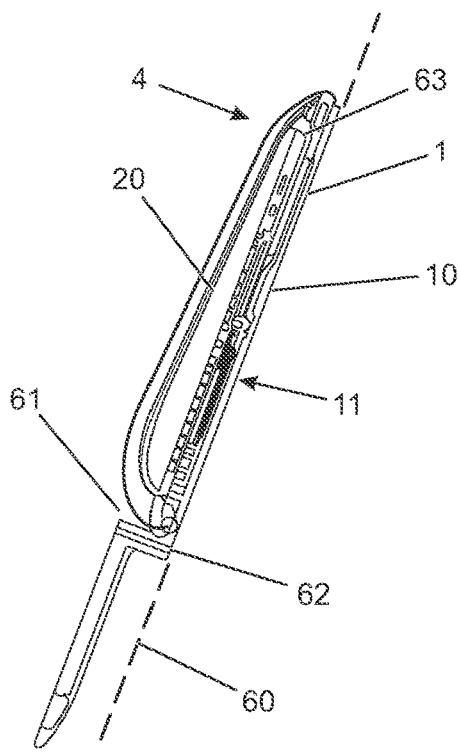

The seat trim 60 comprises a ledge 62 at the bottom of the recess 61 that is configured to support the lower edge of the portable table 1 (which in this case is the edge of the portable table closest to the main hinge 2) when the portable table 1 is in the stowage state, as illustrated in cross-section in FIG. 10a. The upper surface of the ledge 62 is formed with a curved groove that receives the lower edge of the portable table 1, and comprises a lip portion that is configured to prevent movement of the lower edge of the portable table 1 in a direction away from the seat 70. The ledge 62 is configured to bias the portable table 1 upwardly within the recess 61.

Figure 9B:
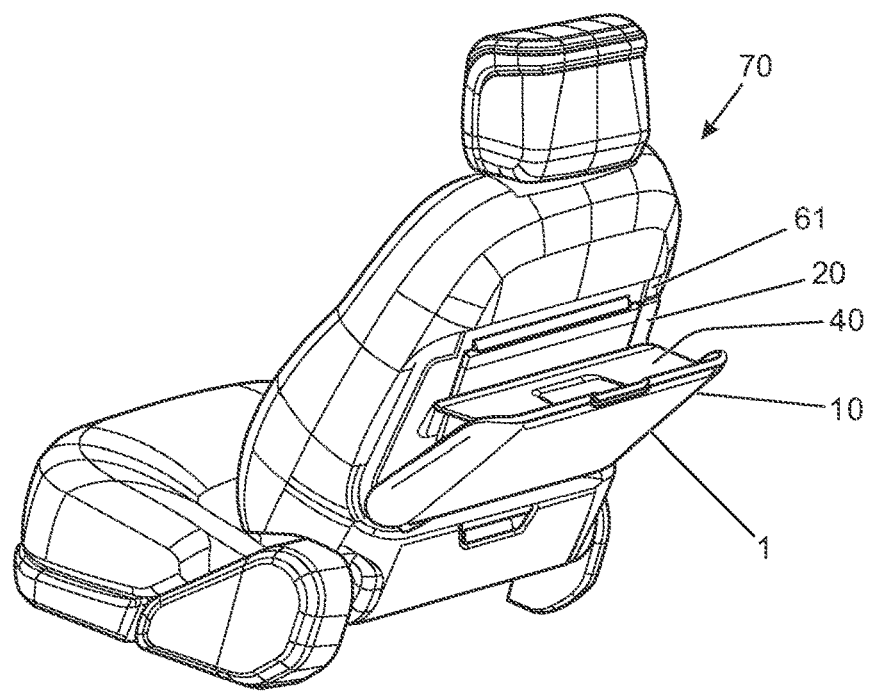
Figure 10B:
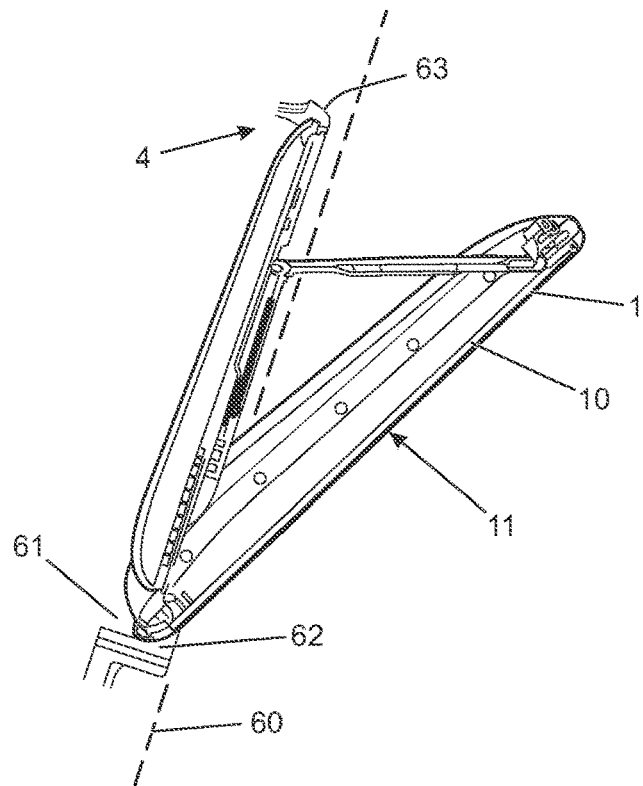

The seat trim 60 further comprises a hooked mounting feature 63 located within the recess 61 that extends horizontally across the recess 61 towards its upper edge, as illustrated in FIG. 9b and FIGS. 10a and 10b. The hooked mounting feature 63 comprises a groove that opens downwardly towards the ledge 62 at the bottom of the recess 61, and a downwardly projecting lip portion located outboard of the groove with respect to the seat 70. When the portable table 1 is in the stowage state the hooked mounting feature 63 extends into the gap 16 formed between the base panel 20 and the main table panel 10, as illustrated in FIG. 10a, and the latch 28 of the base panel 20 extends into the groove of the hooked mounting feature 63 to thereby prevent movement of the portable table 1 in a direction away from the seat 70 and secure the portable table 1 in the stowage state.

It will be appreciated that the portable table 1 may be supplied together with the seat 70 as part of the vehicle 100. However, in some cases vehicle seats may be supplied as configured to receive portable tables as described above, with the portable tables being supplied separately for example as optional extras.

When it is desired to detach the portable table 1 from the seat 70, a user may depress the button 18 at the top edge of the main table panel 10 to thereby retract the latch 28 into the base panel 20 in the manner described above. Once the latch 28 has moved clear of the lip portion of the hooked mounting feature 63 of the seat trim 60, the upper edge of the portable table 1 can be pivoted away from the seat 70, and the portable table 1 can then be lifted out of the recess 61.

The portable table 1 may be replaced after use by lifting the portable table 1 into the recess 61 such that the lower edge of the portable table 1 (the edge of the portable table closest to the main hinge 2) sits in the groove of the ledge 62, and then pivoting the upper edge of the portable table 1 towards the seat 70 and into the recess 61. The button 18 at the top edge of the main table panel 10 may be depressed as the upper edge of the portable table 1 approaches the hooked mounting feature 63 in order to retract the latch 28 and then released once the portable table 1 is fully positioned within the recess 61 such that the latch 28 returns to its extended position and thereby enters the groove of the hooked mounting feature 63 to secure the portable table 1 in the stowage state. However, in some embodiments one or both of the latch 28 and the hooked mounting feature 63 may be configured to deflect or move automatically as the latch 28 impacts the hooked mounting feature 63 during movement of the upper edge of the portable table 1 towards the seat 70, in which case it may not be necessary for a user to depress the button 18 in order to return the portable table 1 to the stowage state.

As described above, the portable table 1 is capable of adopting a closed configuration (for stowage in the seat trim 60) and an angled configuration (for use as a portable table when detached from the seat 70). However, the portable table 1 is also capable of adopting a third configuration or shelf configuration in which it provides a shelf while attached to the seat 70, as illustrated in FIGS. 9b and 10b.

The portable table 1 may be moved into the shelf configuration by pulling the upper edge of the main table panel 10 in a direction away from the seat 70 while the portable table 1 is attached to the seat 70 without depressing the button 18 on the main table panel 10, thereby opening the portable table mechanism while the lower edge of the main table panel 10 remains in the groove of the ledge 62 and the upper edge of the base panel 20 remains clipped into the groove of the hooked mounting feature 63 of the seat trim 60 by the latch 28. As the main table panel 10 pivots away from the seat 70, the lower edge of the main table panel 10 rotates in the groove of the ledge 62, the curved shape of which is configured to facilitate rotation of the main table panel 10 while securely retaining the portable table 1. The curved surface of the ledge 62 also acts to bias the portable table 1 upwardly in order to ensure that the latch 28 remains secure within the groove of the hooked mounting feature 63.

The main table panel 10 continues to rotate away from the base panel 20 (either under the action of gravity and the springs 25 or by being pulled by a user) until it reaches its position of maximum opening, as illustrated in FIGS. 9b and 10b, at which point the portable table 1 is in the shelf configuration. The opening movement is damped by the damping system 26. Once the position of maximum opening has been reached the stopper formation 24c engages the slider panel 30 and prevents further movement of the slider panel 30 away from the main hinge 2, thereby preventing further rotation of the main table panel 10 away from the base panel 20. The main table panel 10 may be prevented from rotating back towards the base panel by the action of gravity on the main table panel. In addition, the portable 1 may further include one or more magnets comprised in the slider panel 30 and one or more corresponding magnets comprised in the base panel 20 that are arranged to attract the slider panel 30 into its position corresponding to the shelf configuration of the portable table 1.

Figure 11A:
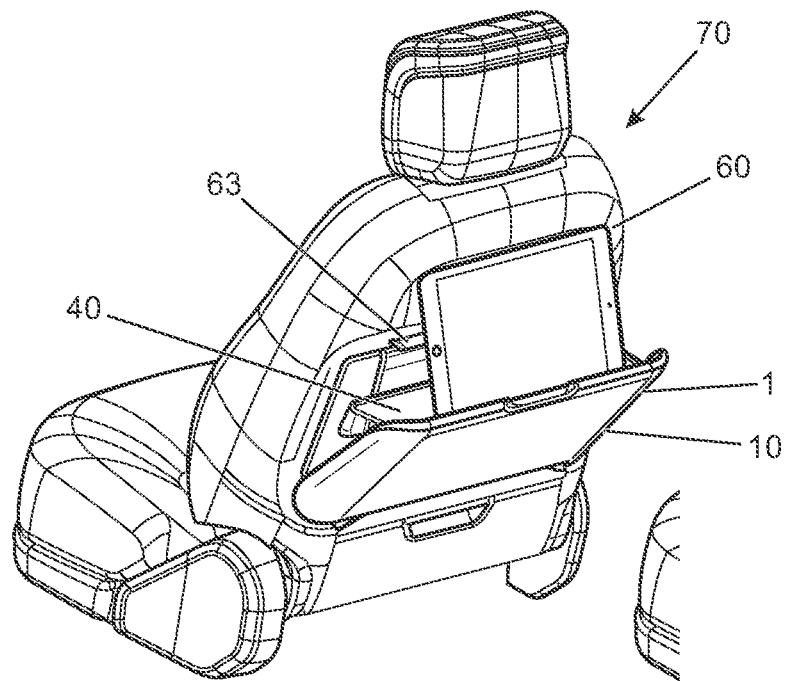
Figure 11B:
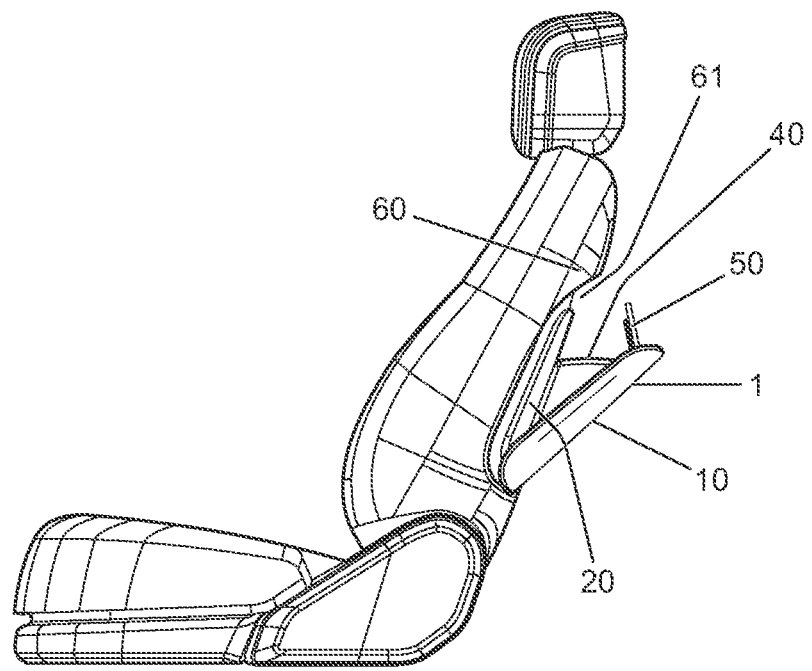

When the portable table 1 is in the shelf configuration, the intermediate panel 40 adopts a substantially horizontal position (which will be slightly affected by the angle at which the seat 70 is set) and may be used as a shelf projecting from the back of the seat 70. For example, a user may place objects such as keys or a phone on the shelf, or may rest a tablet device on the shelf as illustrated in FIG. 11a. In addition, the flap 50 may be pivoted away from the intermediate panel 40 into its locking position, in which it may be used as a stand, for example for holding a mobile phone, as illustrated in FIG. 11b. The flap 50 may also have a reflective surface, and may therefore also be used as a mirror by a passenger sitting in the back seat. Alternatively a separate flap may be provided specifically for the purpose of providing a stand, which may be pivotally mounted to the intermediate panel 40.

Many modifications may be made to the above examples without departing from the scope of the present invention as defined in the accompanying claims.

For example, in the above-described embodiment, the portable table 1 is a simple mechanical table providing a generally planar main table surface 11. However, in other embodiments various other features may be incorporated into the portable table 1, for example a profiled section configured to act as a holder (for example a cup holder), an integrated battery, an integrated light (for example a light on a folding or flexible stem), or a charging port for connecting to an electronic device such as a mobile phone, a tablet device or a lap-top computer. It will be appreciated that many other modifications are also possible In the above-described embodiment, the portable table 1 comprises a main table panel 10 that is pivotally coupled to a base panel 20, and further comprises a coupling mechanism 3 including a slider panel 30 and an intermediate panel 40 for controlling relative movement of the main table panel 10 and the base panel 20. However, in other embodiments the coupling mechanism 3 may be omitted, and the portable table 1 may instead be lockable in the angled configuration by an alternative locking mechanism. In other embodiments the base panel 20 may be omitted altogether, in which case the portable table may generally be formed as a single panel and may not be switchable between closed and angled configurations.

Figure 13:
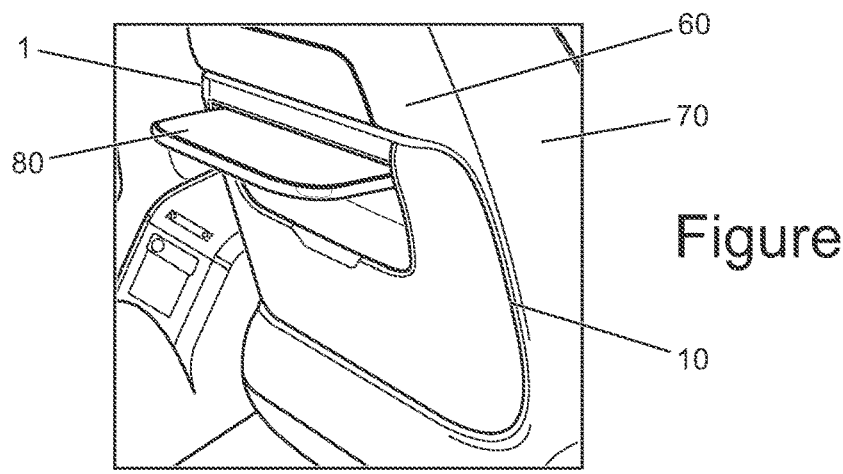
FIG. 13 illustrates a portable table according to an alternative embodiment of the present invention.

In the above-described embodiment, the portable table 1 is operable to provide a shelf while attached to the vehicle seat 70 by moving the main table panel 10 away from the base panel 20 to expose the intermediate panel 40 which is configured to act as a shelf. However, in other embodiments, a shelf may alternatively be provided by simply extending (for example pivoting) a flap 80 out from an outwardly facing surface of the portable table 1, as illustrated in FIG. 13.

It will be appreciated that many other modifications are also possible without departing from the scope of the present invention as defined in the accompanying claims.

It will be appreciated that relative terms such as upper and lower used in the above description are used with respect to the orientation of elements as illustrated in the drawings and are not intended to be limiting in any way.

The invention claimed is:

1. An interior trim assembly for a vehicle, the interior trim assembly comprising an interior trim section and a portable table comprising a table panel and a base, the portable table being releasably attachable to the interior trim section, wherein:

in a stowage state the portable table is integrated with the interior trim section;

in a detached state the portable table is detached from and completely independent of the interior trim section for use as a lap table; and the portable table is switchable between a closed configuration for stowage and an angled configuration in which the table panel provides a table surface angled relative to the base, the angle between the table panel and the base being greater when the portable table is in the angled configuration than when the portable table is in the closed configuration.

2. An interior trim assembly according to claim 1, wherein the portable table is configured to form part of an outer surface of the interior trim section when in the stowage state.

3. An interior trim assembly according to claim 2, wherein at least a portion of the portable table is at least substantially continuous with the outer surface of the interior trim section when the portable table is in the stowage state.

4. An interior trim assembly according to claim 1, wherein
the interior trim section comprises a recess, and
the portable table is at least substantially located within the recess when in the stowage state.

5. An interior trim assembly according to claim 1, wherein the portable table is substantially planar and comprises a pair of opposing edges that are curved or bent out from a plane of the portable table.

6. An interior trim assembly according to claim 1, wherein the portable table comprises a coupling mechanism for controlling relative movement of the table panel and the base, the coupling mechanism comprising a slider arranged to slide along a first one of the table panel and the base, and an intermediate element pivotally coupled to the slider and to a second one of the table panel and the base.

7. An interior trim assembly according to claim 6, wherein the portable table comprises a locking arrangement configured to prevent the portable table from moving out of the angled configuration toward the closed configuration.

8. An interior trim assembly according to claim 7, wherein the locking arrangement comprises a locking element that is reversibly movable into a locking position in which the locking element acts to prevent the portable table from moving out of the angled configuration toward the closed configuration.

9. An interior trim assembly according to claim 8, wherein the locking element is in a form of a panel flap pivotally mounted to the intermediate element.

10. An interior trim assembly according to claim 8, wherein the portable table is movable into a shelf configuration, while attached to the interior trim section, in which the intermediate element provides an upwardly facing surface for use as a shelf.

11. An interior trim assembly according to claim 10, wherein the locking element is movable into a locking position while the portable table is in the shelf configuration to provide a stand that is configured to support an article placed on the portable table.

12. An interior trim assembly according to claim 6, comprising a biasing system configured to impart a biasing force to the slider.

13. An interior trim assembly according to claim 6, comprising a damping system configured to damp movement of the slider relative to the first one of the table panel and the base.

14. An interior trim assembly according to claim 1, wherein the portable table comprises a retention system for releasably retaining the portable table in the closed configuration.

15. An interior trim assembly according to claim 1, comprising an attachment system for releasably retaining the portable table in the stowage state, wherein the attachment system comprises at least one mounting element provided on the portable table that is configured to engage a corresponding at least one mounting feature provided on the interior trim section to thereby secure the portable table to the interior trim section in the stowage state.

16. An interior trim assembly according to claim 1, comprising at least one user-operable element configured to release the portable table from the stowage state.

17. An interior trim assembly according to claim 1, wherein the interior trim section comprises a ledge configured to support a lower edge of the portable table when the portable table is in the stowage state.

18. An interior trim assembly according to claim 17, wherein the ledge comprises a curved groove for receiving the lower edge of the portable table when the portable table is in the stowage state, wherein the curved groove is configured to facilitate pivotal movement of at least a portion of the portable table in a direction away from the interior trim section and the ledge comprises a lip portion configured to prevent movement of the lower edge of the portable table in a direction away from the interior trim section when the portable table is in the stowage state.

19. A vehicle seat comprising the interior trim assembly of claim 1.

20. A vehicle comprising the interior trim assembly of claim 1.

* * * * *